(12) United States Patent
Hartman et al.

(10) Patent No.: US 9,976,284 B2
(45) Date of Patent: May 22, 2018

(54) CONTROL SYSTEM FOR HEADLIGHTS OF A MACHINE

(71) Applicant: Caterpillar Inc., Peoria, IL (US)

(72) Inventors: Ronald W. Hartman, Peoria, IL (US); David C. Atkinson, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days. days.

(21) Appl. No.: 15/212,730

(22) Filed: Jul. 18, 2016

(65) Prior Publication Data
US 2016/0326724 A1 Nov. 10, 2016

(51) Int. Cl.
B60Q 1/02 (2006.01)
E02F 9/26 (2006.01)
H05B 37/02 (2006.01)
H05B 33/08 (2006.01)
B60Q 1/24 (2006.01)
B60Q 1/08 (2006.01)
B60Q 1/18 (2006.01)

(52) U.S. Cl.
CPC .............. *E02F 9/261* (2013.01); *B60Q 1/085* (2013.01); *B60Q 1/18* (2013.01); *B60Q 1/24* (2013.01); *H05B 33/0842* (2013.01); *H05B 37/0227* (2013.01); *B60Q 2300/32* (2013.01); *B60Q 2300/324* (2013.01)

(58) Field of Classification Search
CPC .. G05D 1/0231; G05D 1/0246; G05D 1/0257; G05D 1/0274; G06K 9/00791; B60Q 1/085; B60Q 1/24; B60Q 1/143
USPC ...................................................... 315/77, 82
See application file for complete search history.

(56) References Cited

U.S. PATENT DOCUMENTS

| 7,161,605 | B2 | 1/2007 | Shimazu et al. |
| 8,260,536 | B2 | 9/2012 | Stefani |
| 8,547,018 | B2 | 10/2013 | Hagner |
| 8,831,827 | B2 | 9/2014 | Kim et al. |
| 9,139,977 | B2 | 9/2015 | McCain et al. |
| 2008/0047170 | A1 | 2/2008 | Nichols |
| 2011/0010023 | A1* | 1/2011 | Kunzig ..................... G01S 5/16 701/2 |

(Continued)

FOREIGN PATENT DOCUMENTS

DE 10034381 1/2002
KR 20110072606 6/2011

OTHER PUBLICATIONS

Leica Geosystems, Leica Depthmaster, 2007, pp. 1-2, Heerbrugg, Switzerland, Retrieved Mar. 18, 2016.

*Primary Examiner* — Tung X Le
(74) *Attorney, Agent, or Firm* — James S. Bennin

(57) ABSTRACT

The disclosure relates to a control system for a machine. The control system includes an input unit for obtaining terrain information pertaining to a worksite. The control system further includes a plurality of illumination devices mounted on the machine. The control system further includes a controller in communication with the input unit and the plurality of illumination devices. The controller is configured to receive the terrain information from the input unit. The controller further determines grade pertaining to a work area of the worksite based on the terrain information. The controller is further configured to operate the plurality of illumination devices, based on the grade, to selectively illuminate the work area of the work site.

17 Claims, 4 Drawing Sheets

(56) References Cited

U.S. PATENT DOCUMENTS

| | | | |
|---|---|---|---|
| 2011/0080092 A1* | 4/2011 | Matsumoto | F21S 48/1104 |
| | | | 315/82 |
| 2012/0083982 A1* | 4/2012 | Bonefas | G05D 1/0223 |
| | | | 701/70 |
| 2014/0098997 A1* | 4/2014 | Faber | G06K 9/00825 |
| | | | 382/103 |
| 2016/0318438 A1* | 11/2016 | Wadell | B60Q 1/143 |
| 2017/0131718 A1* | 5/2017 | Matsumura | G05D 1/021 |

* cited by examiner

CONTROL SYSTEM FOR HEADLIGHTS OF A MACHINE

TECHNICAL FIELD

The present disclosure relates to a machine and, more particularly, relates to a control system for the machine.

BACKGROUND

Machines, such as haul trucks, are extensively used during night for performing various operations at a worksite. Generally, for performing operations at night, sufficient lighting is required. Typically, an operator is reliant on headlights mounted on the machines for performing operations at night. However, while performing operations at night, identifying a change in grade at a work area of the worksite may be difficult for the operator relying on the headlights. The machines may be equipped with a monitor for displaying grade information to the operator. The operator, in order to determine the change in the grade, is required to look at the monitor and then switch focus to the work area. Switching focus, between the monitor and the work area, may be inconvenient for the operator and may also affect productivity.

U.S. Pat. No. 8,547,018 (hereinafter referred to as the '018 patent) describes a control system for vehicle headlights. The control system includes a navigation device and a control unit. The control unit controls illumination characteristics of headlights depending on location information received by the navigation device. Further, the illumination characteristics are adapted in compliance with predefined illumination settings if the acquired location information indicates that the headlights are operated on public roads. Also, the illumination characteristics are adapted with illumination settings specified by an operator if the location information shows that the vehicle headlights are being operated on non-public roads. However, the '018 patent fails to disclose a control system, for headlights, that accounts for changes in grades at a work area of a worksite.

SUMMARY OF THE DISCLOSURE

In one aspect of the present disclosure, a control system for a machine is provided. The control system includes an input unit for obtaining terrain information pertaining to a worksite. The control system further includes a plurality of illumination devices mounted on the machine. The control system further includes a controller in communication with the input unit and the plurality of illumination devices. The controller is configured to receive the terrain information from the input unit. The controller is further configured to determine grade, pertaining to a work area of the worksite, based on the terrain information. The controller is further configured to operate the plurality of illumination devices, based on the grade, to selectively illuminate the work area of the work site.

In another aspect of the present disclosure, a machine is provided. The machine includes a power source for supplying power to the machine. The machine further includes a control system for controlling operations of the machine. The control system includes an input unit for obtaining terrain information pertaining to a worksite. The control system further includes a plurality of illumination devices mounted on the machine. The control system further includes a controller in communication with the input unit and the plurality of illumination devices. The controller is configured to receive the terrain information from the input unit. The controller is further configured to determine grade, pertaining to a work area of the worksite, based on the terrain information. The controller is further configured to operate the plurality of illumination devices, based on the grade, to selectively illuminate the work area of the work site.

In yet another aspect of the present disclosure, a method of operating a plurality of illumination devices is provided. The method includes receiving terrain information, from an input unit, pertaining to a worksite. The method further includes determining a grade pertaining to a work area of the worksite. The method further includes operating a plurality of illumination devices based on the grade, to selectively illuminate the work area of the work site.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in singular may also be construed to relate to the plural and vice-versa without limiting the scope of the disclosure to the exact number or type of such elements unless set forth explicitly in the appended claim. For example, as used herein, the articles "a" and "an" are intended to include one or more items, and may be used interchangeably with "one or more". Furthermore, as used herein, the term "set" is intended to include one or more items, and may be used interchangeably with "one or more." Additionally, the phrase "adapted to" may be used interchangeably with the phrase "configured to."

Figure 1:
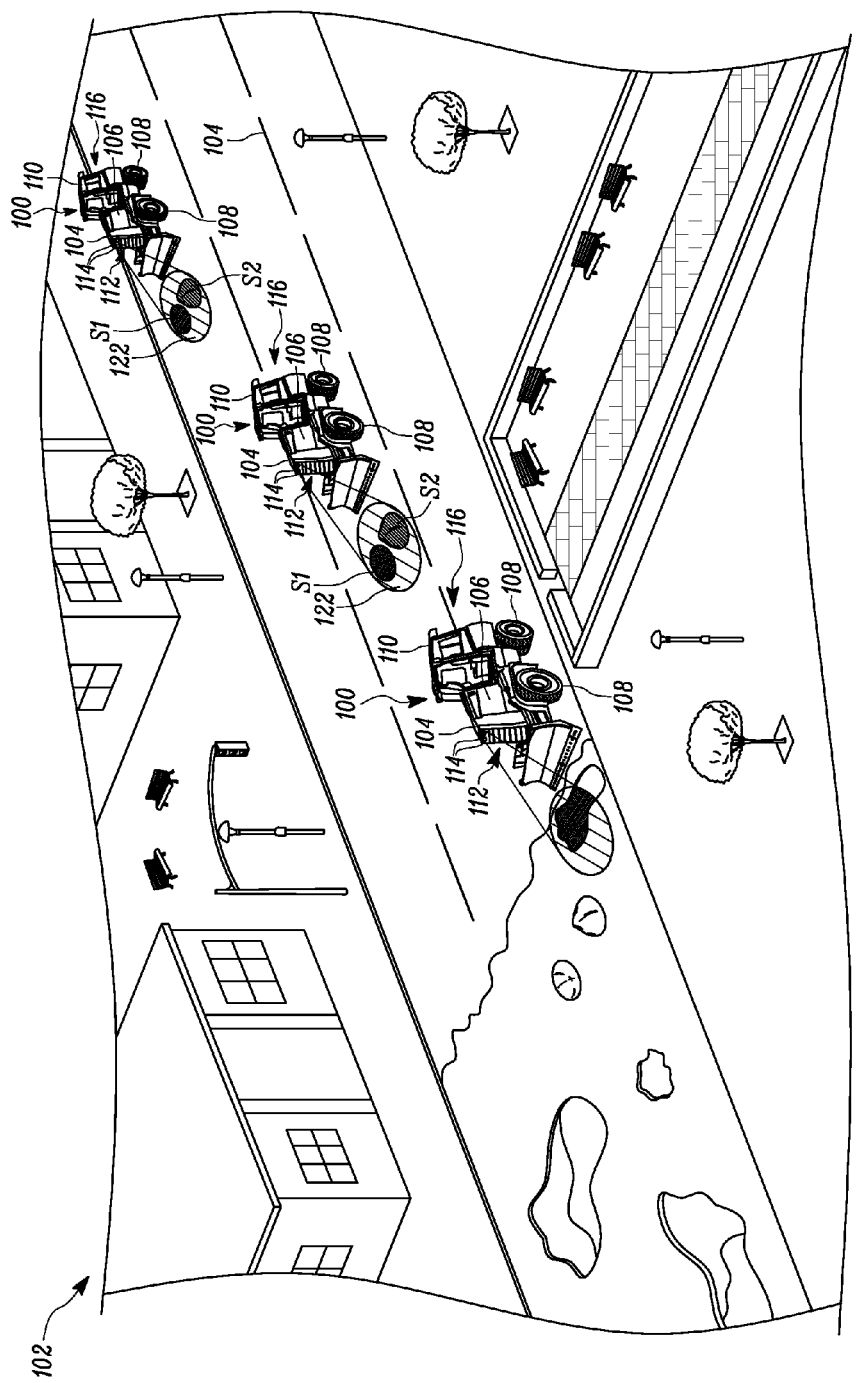
FIG. 1 is a perspective view of a machine operating at a worksite, according to an embodiment of the present disclosure.

FIG. 1 illustrates a perspective view of a machine 100 operating at a worksite 102, according to an embodiment of the present disclosure. In the illustrated example, the machine 100 may be an earth moving machine, such as a bulldozer (or dozer) having traction devices. The traction devices may include, for example, tracks, wheels, and/or the like. For the purpose of the present disclosure, hereinafter the terms "machine" and "dozer" may be used interchangeably. It should be noted that the machine 100 may alternatively be any other machine, such as, but not limited to, an excavator, a backhoe, a loader, a motor grader, and/or any other machine capable of transporting material from one location to another location. In an example, the machine 100 may be configured to perform operations at the worksite 102, for example, a mine site, a landfill, a quarry, a road site, a farm, a construction site, or any other similar type of worksite. The machine 100 may be any of a manual, an automated or a semi-automated machine.

The machine 100 includes a frame 104 to support various components. The machine 100 may include a power source 106 configured to power the traction devices, and power other systems and assemblies in the machine 100. The power source 106 may be any one or a combination of an internal combustion engine, a gas turbine, a hybrid engine, a non-conventional power source like batteries, electric motor, and/or or any other power source known in the art to power the machine 100. The machine 100 may further include a powertrain (not shown) and a set of ground engaging members 108. The powertrain may include a transmission unit including gears, drive shafts, propeller shaft, and other known drive links for transmission of motive power from the power source 106 to the set of ground engaging members 108. The machine 100 may further include an operator cabin 110 provided at a front end 112 of the machine 100. The operator cabin 110 may house various controls of the machine 100. The various controls provided in the operator cabin 110 may include, but not limited to, steering control (not shown) for guiding the machine 100, air conditioning control (not shown), and/or any other control known in the art.

It may be contemplated that the machine 100 may be deployed at different locations or work areas within the worksite 102. The machine 100 may move from one location to another location within the worksite 102, based on the requirements of the operation carried out on the worksite 102. The different locations or work areas of the worksite 102 may have different grades. As such, different locations or work areas within the worksite 102 may have different grades such as a vertically inclined surface or an uphill surface, a sloped surface or a downhill surface, a flat horizontal surface, a rough or uneven surface, and/or the like.

The machine 100 may further include a plurality of illumination devices 114. The plurality of illumination devices 114, also referred to as headlights or headlamps, may be disposed at pre-identified locations on the machine 100. As illustrated in FIG. 1, the plurality of illumination devices 114 may be located at the front end 112 of the machine 100. The plurality of illumination devices 114 may otherwise be located at multiple other locations on the machine 100, such as a rear end 116, a top of the operator cabin 110, and/or the like.

The plurality of illumination devices 114 may illuminate a work area of the worksite 102, proximal to the machine 100. In some implementations, the plurality of illumination devices 114 may include a cluster of Light Emitting Diodes (LEDs). Each LED, of the cluster of LEDs, may be illuminated individually. Alternatively, or additionally, the plurality of illumination devices 114 may include a cluster of bulbs. The plurality of illumination devices 114 may illuminate the work area of the worksite 102 to provide adequate lighting on the work site 102 for enabling an operator to perform desired operations.

In some implementations, the plurality of illumination devices 114 may be configured to illuminate the work area in a plurality of illumination patterns. In other words, the plurality of illumination devices 114 may be configured to illuminate the work areas of the worksite 102 in a plurality of illumination patterns. In some implementations, the plurality of illumination patterns may include illumination of the plurality of illumination devices 114 in different light intensity. Additionally, or alternatively, the plurality of illumination patterns may include illumination of the plurality of illumination devices 114 in different shapes or illumination in different colors. Additionally, or alternatively, the plurality of illumination patterns may include flickering illumination, and selective illumination of plurality of illumination devices 114. Additionally, or alternatively, the plurality of illumination patterns further may include a first illumination pattern 118, a second illumination pattern 120, and a third illumination pattern 122. In an example, the first illumination pattern 118 may correspond to a first type of grade within the worksite 102. Similarly, the second illumination pattern 120 may correspond to a second type of grade within the worksite 102, and the third illumination pattern 122 may correspond to a third type of grade within the worksite 102. In some implemenations, the first illumination pattern 118, the second illumination pattern 120, and the third illumination pattern 122 may include sub patterns of illuminations that are on the worksite 102 (e.g., based on road condition). The plurality of illumination patterns may include sub patterns, such as a sub pattern 'S1' for a pothole and a sub pattern 'S2' for a heap within the worksite 102. As shown in FIG. 1, the plurality of illumination devices 114 illuminate the worksite 102 with the third illumination pattern 122 along with the sub pattern S1 and the sub pattern S2.

Figure 2:
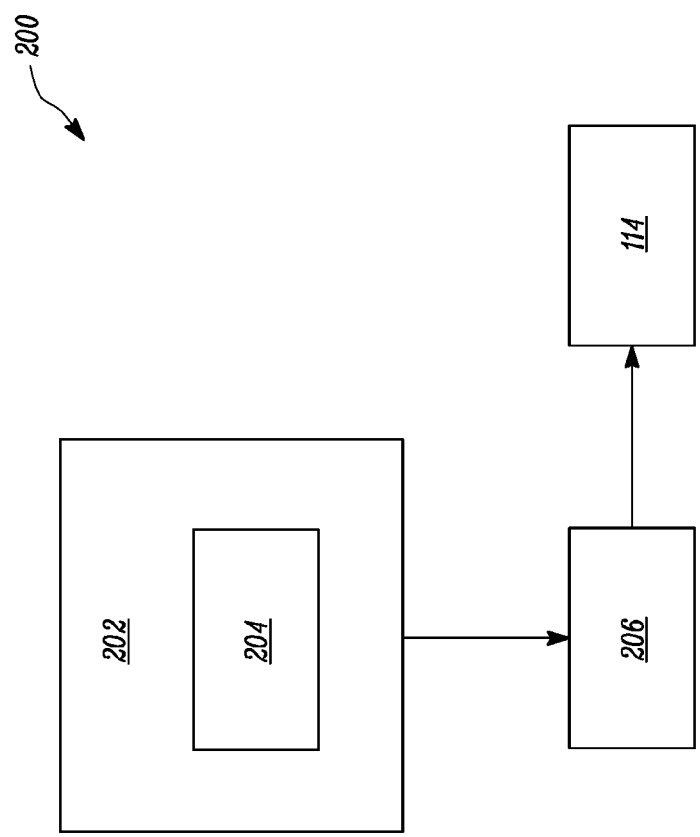
FIG. 2 is a block diagram of a control system of the machine of FIG. 1, according to an embodiment of the present disclosure.
Figure 3:
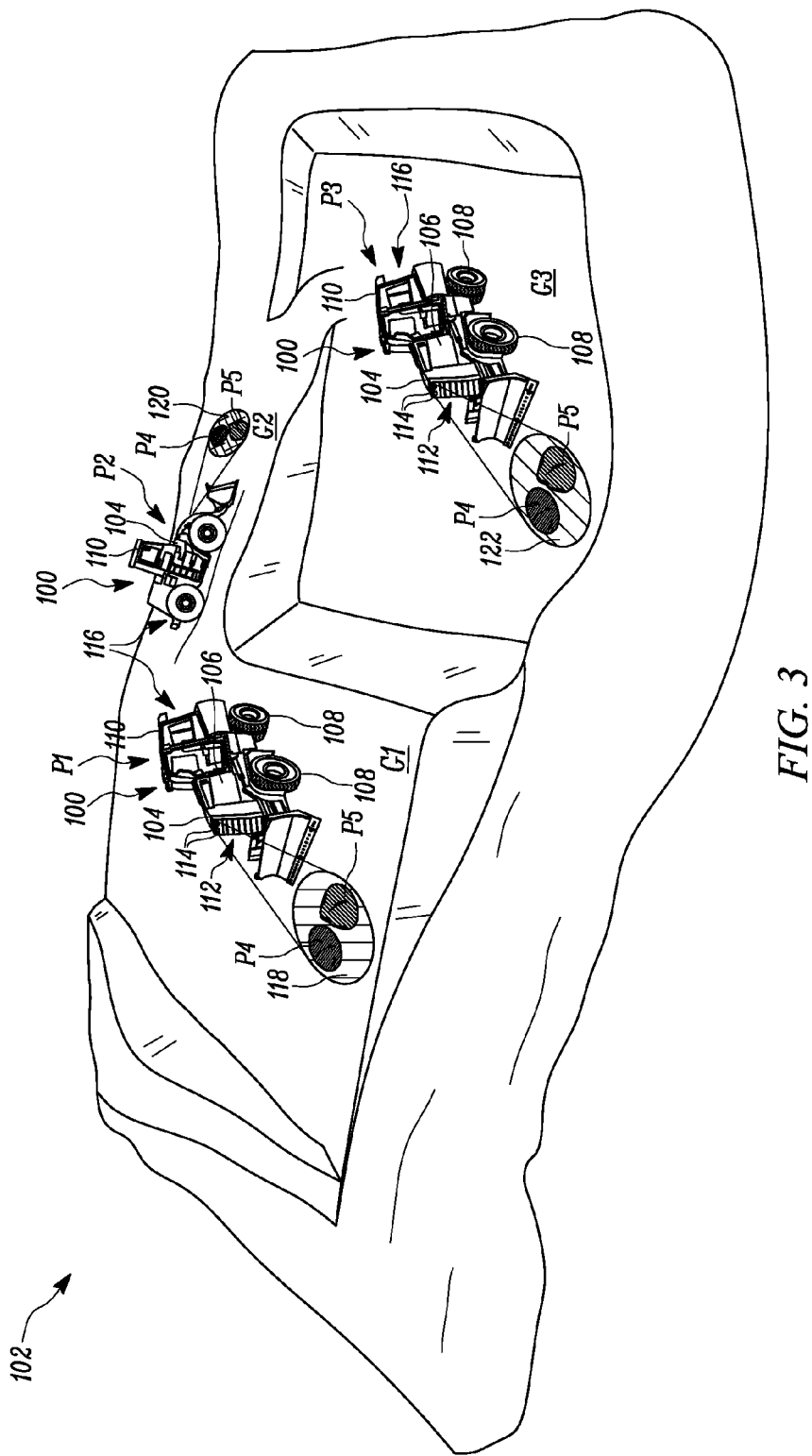
FIG. 3 shows the machine in different positions within the worksite, according to an embodiment of the present disclosure.

FIG. 2 illustrates a block diagram of a control system 200 of the machine 100 and FIG. 3 shows the machine 100 in different locations at the worksite 102. The manner in which the control system 200 operates the plurality of illumination devices 114 is explained in detail with reference to the FIG. 2 and FIG. 3. The control system 200 may include an input unit 202 for obtaining terrain information pertaining to the worksite 102.

It may herein be noted that, the terrain information gathered by the input unit 202 may include a variety of data associated with the worksite 102, such as grade data and type of grade. In some implementations, terrain information may also include a terrain map. The terrain map may include work surface data that includes terrain parameters, such as ground elevation, earthen material composition and/or consistency of a ground surface 124 at different locations within the worksite 102. Additionally, the terrain map may include location, size, shape, composition, and/or consistency of above or below-ground obstacles. In some implementations presence and position of roads, utility lines, storage tanks, buildings, property boundaries, trees, bodies of water, other obstacles and/or the like may also be included in the terrain information.

The input unit 202 may also be configured to determine location information of the machine 100. The location information of the machine 100 may include coordinates of the machine 100 identifying a position of the machine 100 within the worksite 102. The location information of the machine 100 may be determined by one or more of a Global Positioning System (GPS), Global Navigation Satellite System (GNSS), laser-based positioning system, trilateration/triangulation based system using cellular or Wi-Fi networks, pseudo-satellite, ranging radio, and/or the like. In addition to the location information of the machine 100, the input unit 202 may also be configured to track movement of the machine 100 in real-time.

The control system 200 may further include a storage unit 204. The storage unit 204 may be in communication with the input unit 202. Accordingly, the storage unit 204 may be adapted to receive and store the terrain information, pertaining to the worksite 102, obtained by the input unit 202. The storage unit 204 of the control system 200 may further be adapted to store information pertaining to a plurality of predefined grades (e.g., based on previously obtained terrain information). In some implementations, the plurality of predefined grades may be a list of probable grades that may be present on the worksite 102. Additionally, or alternatively, the plurality of predefined grades, stored in the storage unit 204, may include a list of predefined worksite characteristic (e.g., based on previously obtained terrain information) that may have an effect on operations of the machine 100. For example, the list of predefined worksite characteristic may indicate the presence of a ditch on the worksite 102, a pothole on the worksite 102, and/or the like. In an example, the plurality of predefined grades may include, but not limited to, a grade "G1" is corresponding to the uphill surface, a grade "G2" is corresponding to the downhill surface, a grade "G3" is corresponding to the flat horizontal surface, and/or the like.

In some implementations, storage unit 204 may be further adapted to store information pertaining to the plurality of illumination patterns corresponding to the plurality of predefined grades. For example, storage unit 204 may store information identifying each of the plurality of predefined grade in association with information identifying a corresponding illumination pattern of the plurality of illumination patterns. In some implementations, each of the illumination pattern corresponding to the uphill surface having the grade "G1" the illumination pattern corresponding to the downhill surface having the grade "G2" and the illumination pattern corresponding to the flat horizontal surface having the grade "G3" may each be different with respect to another.

The control system 200 may further include a controller 206 in communication with the input unit 202 and the plurality of illumination devices 114. In some implementations, the controller 206 may be a processor that includes one or more processing units, all of which include multiple computing units. The processor may be implemented as hardware, software, or a combination of hardware and software capable of executing a software application. In some embodiments, the controller 206 may be implemented as one or more microprocessors, microcomputers, digital signal processors, central processing units, state machines, logic circuitries, and/or any device that is capable of manipulating signals based on operational instructions. Among the capabilities mentioned herein, the controller 206 may also be configured to receive, transmit, and execute computer-readable instructions. The controller 206 may be configured to control various systems and sub-assemblies of the machine 100 and, thus, may control many aspects of the operations of the machine 100. For example, the controller 206 may be configured to operate the plurality of illumination devices 114, based on the information, pertaining to the plurality of predefined grades (e.g., identified based on the terrain information) to selectively illuminate the work area of the worksite 102.

As shown in FIG. 3, the machine 100 may be in different positions, such as a first position "P1" having a corresponding work area, a second position "P2" having a corresponding work area, and a third position "P3" having a corresponding work area. At the position "P1", the corresponding work area may be the uphill surface having the grade "G1". Likewise, at the position "P2", the corresponding work area may be the downhill surface having the grade "G2". At the position "P3", the corresponding work area may be the flat horizontal surface having the grade "G3". Although, in the present implementation, the machine 100 is shown at "P1", "P2", and "P3", it may be understood that the machine 100 may be at multiple other positions within the worksite 102, with each of such multiple other positions of the machine having its own grade.

In some implementations, when the machine 100 is at the first position "P1", the controller 206, being in communication with the input unit 202, may receive the terrain information pertaining to the worksite 102. Further the controller 206 may receive the location information of the machine 100 within the worksite 102. Alternatively, or additionally, the controller 206 may identify the work area based on the location of the machine 100. Further, the work area identified by the controller 206 may be proximal to the location of the machine 100. Based on the terrain information received from the input unit 202, and the location information of the machine 100, the controller 206 may determine the grade pertaining to the work area of the worksite 102. The controller 206 may, based on the terrain information pertaining to the worksite 102, determine the type of grade at the work area of the worksite 102. The controller 206 may also identify the determined grade to be the grade "G1." Upon identifying the grade to be the grade "G1" the controller 206 may further send signals to the plurality of illumination devices 114 to illuminate the work area of the worksite 102 with the first illumination pattern 118 of the plurality of illumination patterns. As such, a portion in front of the machine 100 that is visible to the operator, other than the work area illuminated with the first illumination pattern 118, may be illuminated with white light by the plurality of illumination devices 114. As described earlier, the first illumination pattern 118 includes sub patterns, such as a pattern 'P4' for a pothole and a pattern 'P5' for a heap of material (e.g., dirt) at the grade "G1". As such, the pattern 'P4' may vary with respect to the pattern 'P5' in terms of shape, color, and/or light intensity illuminated by the plurality of illumination devices 114.

In some implementations, when the machine 100 is at the second position "P2", the controller 206, being in communication with the input unit 202, may receive the terrain information pertaining to the worksite 102. Further the controller 206 may receive the location information of the machine 100 within the worksite 102. Alternatively, or additionally, the controller 206 may identify the work area based on the location of the machine 100. Further, the work area identified by the controller 206 may be proximal to the location of the machine 100. Based on the terrain information received from the input unit 202, and the location information of the machine 100, the controller 206 may determine the grade pertaining to the work area of the worksite 102. The controller 206 may, based on the terrain information pertaining to the worksite 102, determine the type of grade at the work area of the worksite 102. The controller 206 may also identify the determined grade as the grade "G2." Upon identifying grade to be the grade "G2", the controller 206 may further send signals to the plurality of illumination devices 114 to illuminate the work area of the worksite 102 with the second illumination pattern 120 of the plurality of illumination patterns. As such, a portion in front of the machine 100 that is visible to the operator, other than the work area illuminated with the second illumination pattern 120, at the worksite 102 would be illuminated with white light by the plurality of illumination devices 114. As described earlier, the second illumination pattern 120 may include sub patterns, such as the pattern 'P4' for a pothole and the pattern 'P5' for a heap of material (e.g., dirt)

corresponding at the grade "G2" at the worksite 102. As such, the pattern 'P4' may vary as compared to the pattern 'P5' in terms of shape, color, light intensity and/or the like.

Likewise, the controller 206 may also identify the determined grade as the grade "G3". Upon identifying the grade to be the grade "G3", the controller 206 may operate the plurality of illumination devices 114 to illuminate the work area of the worksite 102 with the third illumination pattern 122 of the plurality of illumination patterns. As such, a portion in front of the machine 100 that is visible to the operator, other than the work area illuminated with the third illumination pattern 122, at the worksite 102 may be illuminated with white light by the plurality of illumination devices 114. As described earlier, the third illumination pattern 122 may include sub patterns, such as the pattern 'P4' for a pothole and the pattern 'P5' for a heap of material (e.g., dirt) at the grade "G3" at the worksite 102. As such, the pattern 'P4' may vary as compared to the pattern 'P5' in terms of shape, color, light intensity and/or the like.

In some implementations, the controller 206 may be further configured to detect a change in grade at the worksite 102 and operate the plurality of illumination devices 122 to switch from one illumination pattern to another illumination patter, based on the detected grade of the worksite 102. Additionally, or alternatively, when the machine 100 moves from one position (e.g., "P1") to another position (e.g., "P2"), the machine 100 may detect different road conditions (e.g., pothole(s), heap(s) of material, and/or the like). In such scenario, the controller 206 may operate the plurality of illumination devices 122 to illuminate the worksite 102 using sub patterns, based on the road conditions.

INDUSTRIAL APPLICABILITY

The present disclosure relates to the control system 200 for controlling operations of the machine 100 at the worksite 102. More specifically, the control system 200 controls the plurality of illumination devices 114 of the machine 100 to enable the operator to discern changes in grade.

Figure 4:
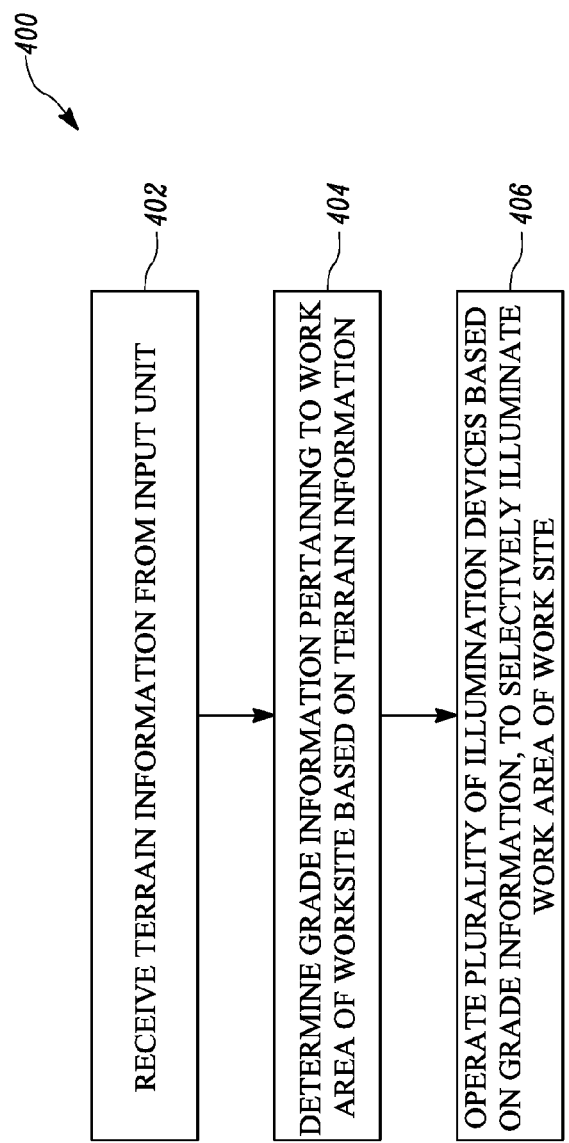
FIG. 4 is a flowchart of a method for operating a plurality of illumination devices, according to an embodiment of the present disclosure.

FIG. 4 is a flowchart of a method 400 for operating the plurality of illumination devices 206. The steps in which the method 400 is described are not intended to be construed as a limitation, and any number of steps can be combined in any order to implement the method 400. Further, the method 400 may be implemented using any suitable software, hardware, or a combination of software and hardware, such that the software, the hardware, or the combination of software and hardware employed can perform the steps of the method 400 readily and on a real-time basis. In an example, the control system 200 can be configured to perform the steps of the method 400.

At step 402, the method 400 includes, receiving the terrain information from the input unit 202 pertaining to the worksite 102. Further, at step 404, the method 400 includes, determining the grade pertaining to the work area of the worksite 102. The input unit 202 may determine the type of grade by obtaining information from the GPS. The controller 206 of the control system 200 determines the grade using the input unit 202 and sends signals to the plurality of illumination devices 114. The signal received by the plurality of the illumination devices 114 may be indicative of the grade of the work area at the worksite 102. At step 406, the method 400 further includes, operating the plurality of illumination devices 114 based on the grade, to selectively illuminate the work area of the worksite 102.

The method 400 further includes identifying the location of the machine 100 within the worksite 102. Further, the method 400 includes identifying the grade pertaining to the work area of the worksite 102 proximal to the location of the machine 100, as one of the plurality of predefined grades, such as the grade "G1", the grade "G2" or the grade "G3". The method 400 further includes operating the plurality of illumination devices 114 to selectively illuminate the work area of the worksite 102 in one of the plurality of illumination patterns, such as the first illumination pattern 118, the second illumination pattern 118, or the third illumination pattern 122. The method 400 further includes illuminating the plurality of illumination devices 114 in one of the plurality of illumination patterns corresponding to one of the plurality of predefined grades.

The control system 200 of the present disclosure selectively illuminates the work area of the worksite 102 enabling the operator to discern change in terrain at the worksite 102. Further, by selectively illuminating the work area of the worksite 102, the control system 200 facilitates the operator in determining the grade of an approaching work area at the worksite 102. As a result, the control system 200 of the machine 100 precludes the need of the operator in switching focus, between monitor and the work area during operation of the machine 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for a machine, the control system comprising:
    an input unit for obtaining terrain information pertaining to a worksite;
    a plurality of illumination devices mounted on the machine;
    a storage unit configured to store information identifying each grade of a plurality of grades based on different terrain information and information identifying an illumination pattern corresponding to each grade of the plurality of grades; and
    a controller in communication with the input unit and the plurality of illumination devices, the controller being configured to:
        receive the terrain information from the input unit;
        determine a grade pertaining to a work area of the worksite based on the terrain information and the information identifying each grade of the plurality of grades; and
        operate the plurality of illumination devices, based on the grade and the information identifying the illumination pattern corresponding to each grade of the plurality of grades, to selectively illuminate the work area of the work site.

2. The control system of claim 1, wherein the controller is configured to operate the illumination devices to selectively illuminate in one of a plurality of illumination patterns.

3. The control system of claim 1, wherein the controller is configured to:
    identify a location of the machine within the worksite; and
    identify the work area based on the location of the machine, the work area being proximate to the location of the machine.

4. The control system of claim 1, wherein the plurality of grades includes an uphill surface, a downhill surface, a flat horizontal surface, and an uneven surface.

5. The control system of claim 1, wherein the controller is configured to operate the plurality of illumination devices to cause the plurality of illumination devices to selectively illuminate the work area in one of a plurality of illumination patterns based on a particular road condition associated with the work area.

6. A machine comprising:
a power source for supplying power to the machine;
a control system for controlling operations of the machine, the control system includes:
an input unit for obtaining terrain information pertaining to a worksite;
a plurality of illumination devices mounted on the machine;
a storage unit configured to store information identifying each grade of a plurality of grades based on different terrain information and information identifying an illumination pattern corresponding to each grade of the plurality of grades; and
a controller in communication with the input unit and the plurality of illumination devices, the controller being configured to:
receive the terrain information from the input unit;
determine a grade pertaining to a work area of the worksite based on the terrain information and the information identifying each grade of the plurality of grades; and
operate the plurality of illumination devices, based on the grade and the information identifying the illumination pattern corresponding to each grade, to selectively illuminate the work area of the work site.

7. The machine of claim 6, wherein the controller is configured to operate the illumination devices to selectively illuminate in one of a plurality of illumination patterns.

8. The machine of claim 6, wherein the controller is configured to:
identify a location of the machine within the worksite; and
identify the work area based on the location of the machine,
the work area being proximate to the location of the machine.

9. The machine of claim 6, wherein the plurality of grades includes an uphill surface, a downhill surface, a flat horizontal surface, and an uneven surface.

10. The machine of claim 6, wherein the controller is configured to operate the plurality of illumination devices to cause the plurality of illumination devices to illuminate the work area in one of the plurality of illumination patterns based on a particular road condition associated with the work area.

11. A method of operating a plurality of illumination devices, the method comprising:
receiving, by a controller, terrain information from an input unit pertaining to a worksite;
determining, by the controller and based on the terrain information, a grade pertaining to a work area of the worksite; and
operating, by the controller, a plurality of illumination devices based on the grade, to selectively illuminate the work area of the work site,
wherein operating the plurality of illumination devices includes: operating the plurality of illumination devices to selectively illuminate in one of a plurality of illumination patterns based on the grade and information identifying an illumination pattern, of the plurality of illumination patterns, corresponding to each grade of a plurality of different grades.

12. The method of claim 11 further comprising operating the illumination devices to selectively illuminate in one of a plurality of illumination patterns.

13. The method of claim 11 further comprising identifying a location of the machine within the worksite and identifying the work area based on the location of the machine, the work area being proximate to the location of the machine.

14. The method of claim 11 further comprising identifying the grade from the plurality of grades based on the terrain information.

15. The method of claim 11 further comprising operating the plurality of illumination devices to cause the plurality of illumination devices to illuminate the work area in one of the plurality of illumination patterns corresponding to one of a plurality of road conditions.

16. The method of claim 11 further comprising a storage unit adapted to store information identifying each grade of the plurality of grades based on different terrain information and information identifying an illumination pattern corresponding to each grade of the plurality of grades.

17. The method of claim 16, wherein the plurality of grades including an uphill surface, a downhill surface, a flat horizontal surface, and an uneven surface.

* * * * *

UNITED STATES PATENT AND TRADEMARK OFFICE
CERTIFICATE OF CORRECTION

| | |
|---|---|
| PATENT NO. | : 9,976,284 B2 |
| APPLICATION NO. | : 15/212730 |
| DATED | : May 22, 2018 |
| INVENTOR(S) | : Ronald W. Hartman, David C. Atkinson and Derrick Amanor |

It is certified that error appears in the above-identified patent and that said Letters Patent is hereby corrected as shown below:

On the Title Page

Please add the following inventor:

Derrick Amanor, Peoria, IL

Signed and Sealed this
Twenty-sixth Day of June, 2018

Andrei Iancu
*Director of the United States Patent and Trademark Office*